June 3, 1958 M. R. VENY 2,837,129
AIR DISTRIBUTOR FOR INFLATING AND BALANCING
PNEUMATIC TIRES FOR VEHICLE WHEELS
Filed July 13, 1956 5 Sheets-Sheet 1
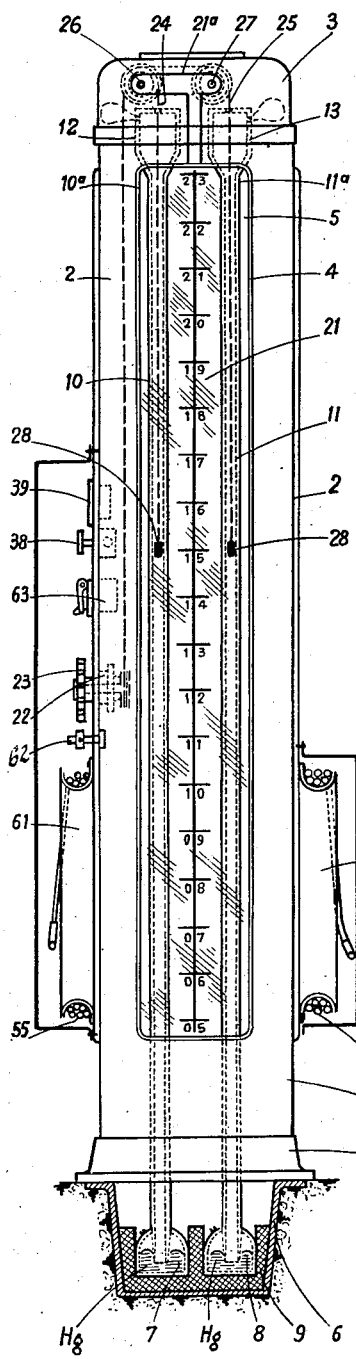
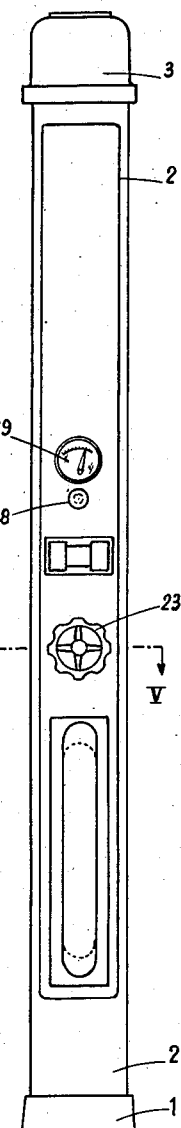
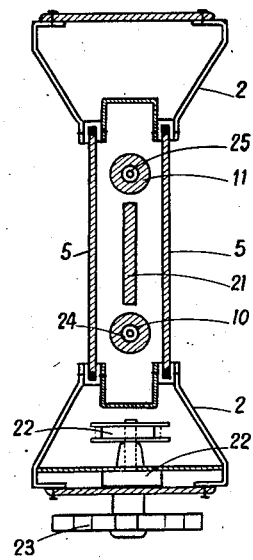
INVENTOR
MAURICE RENÉ VENY
ATTORNEY

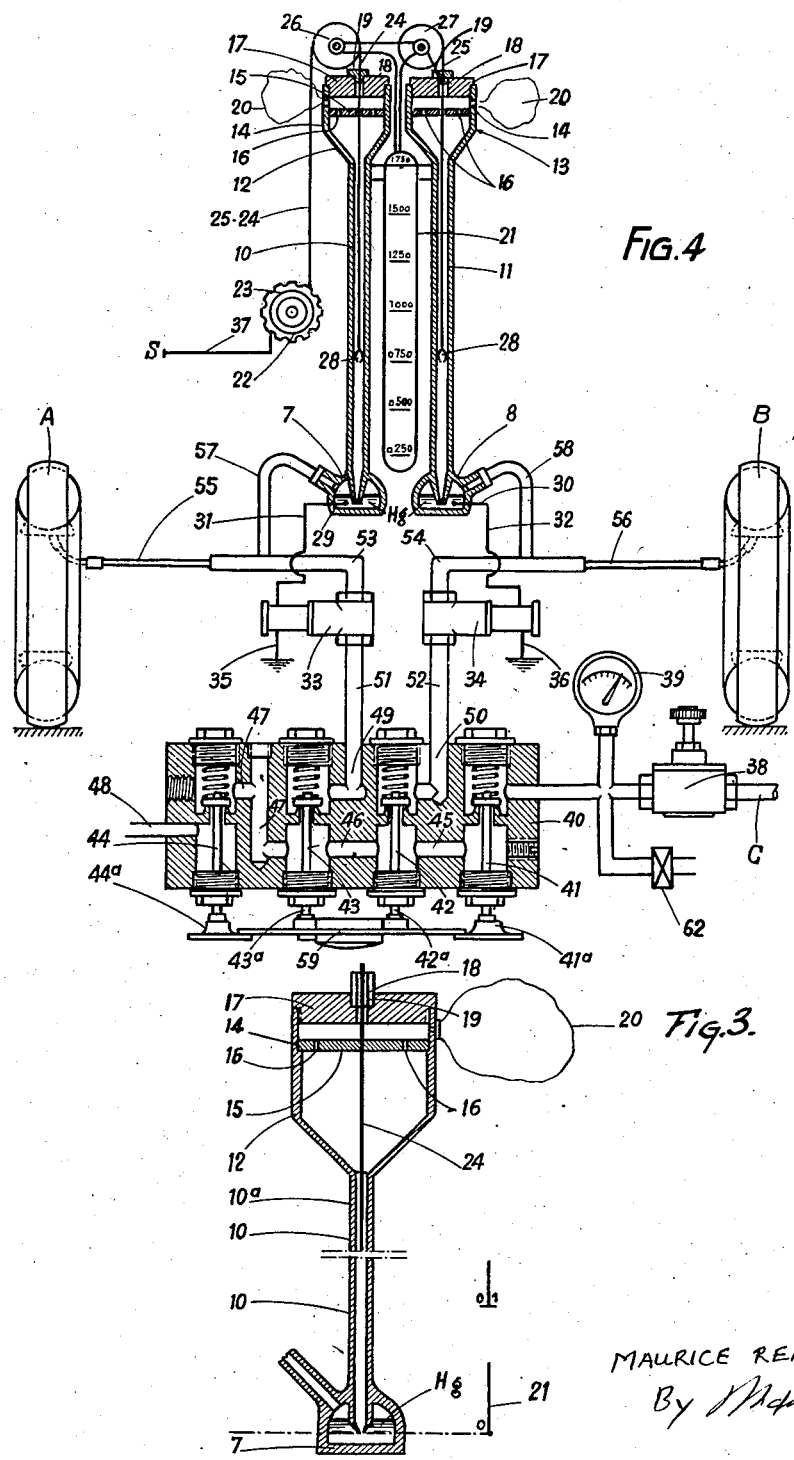

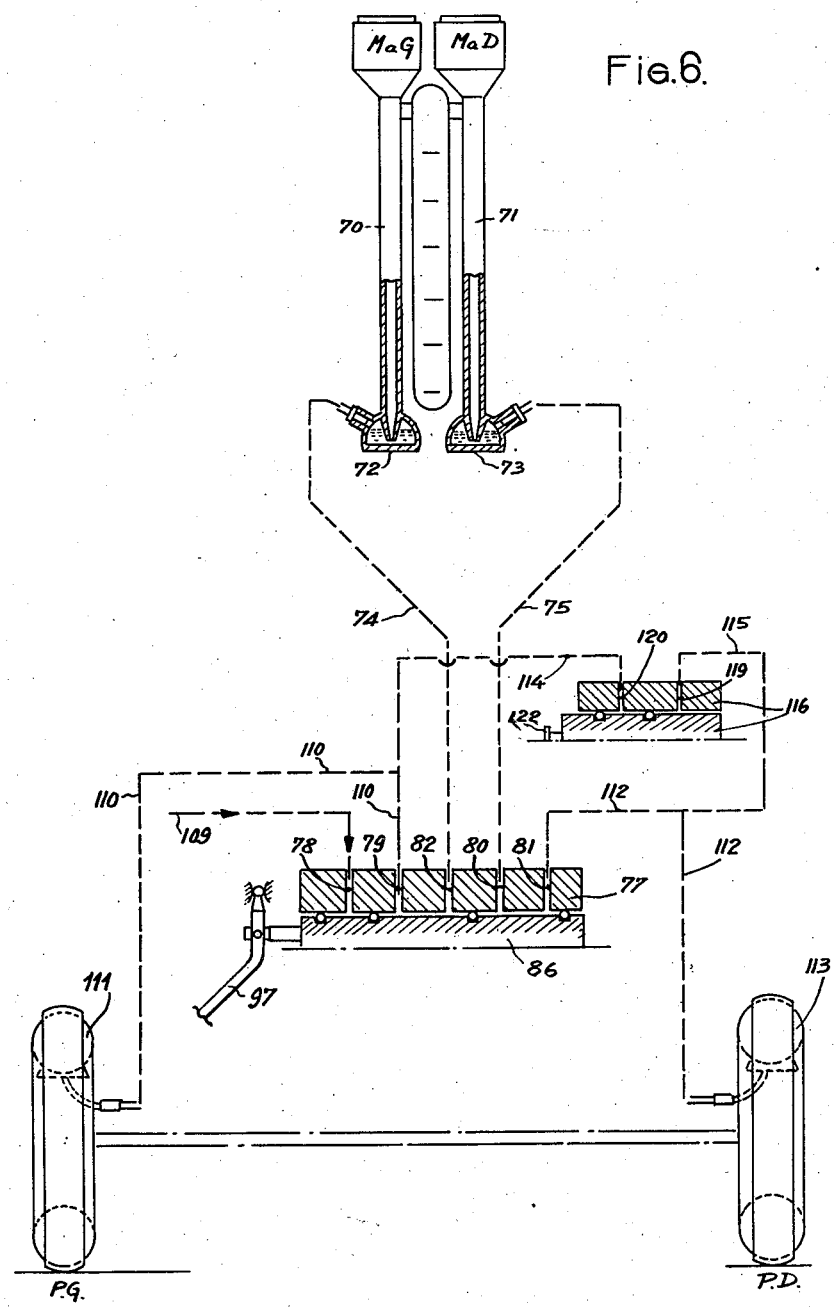

June 3, 1958
M. R. VENY
2,837,129
AIR DISTRIBUTOR FOR INFLATING AND BALANCING
PNEUMATIC TIRES FOR VEHICLE WHEELS
Filed July 13, 1956
5 Sheets-Sheet 4
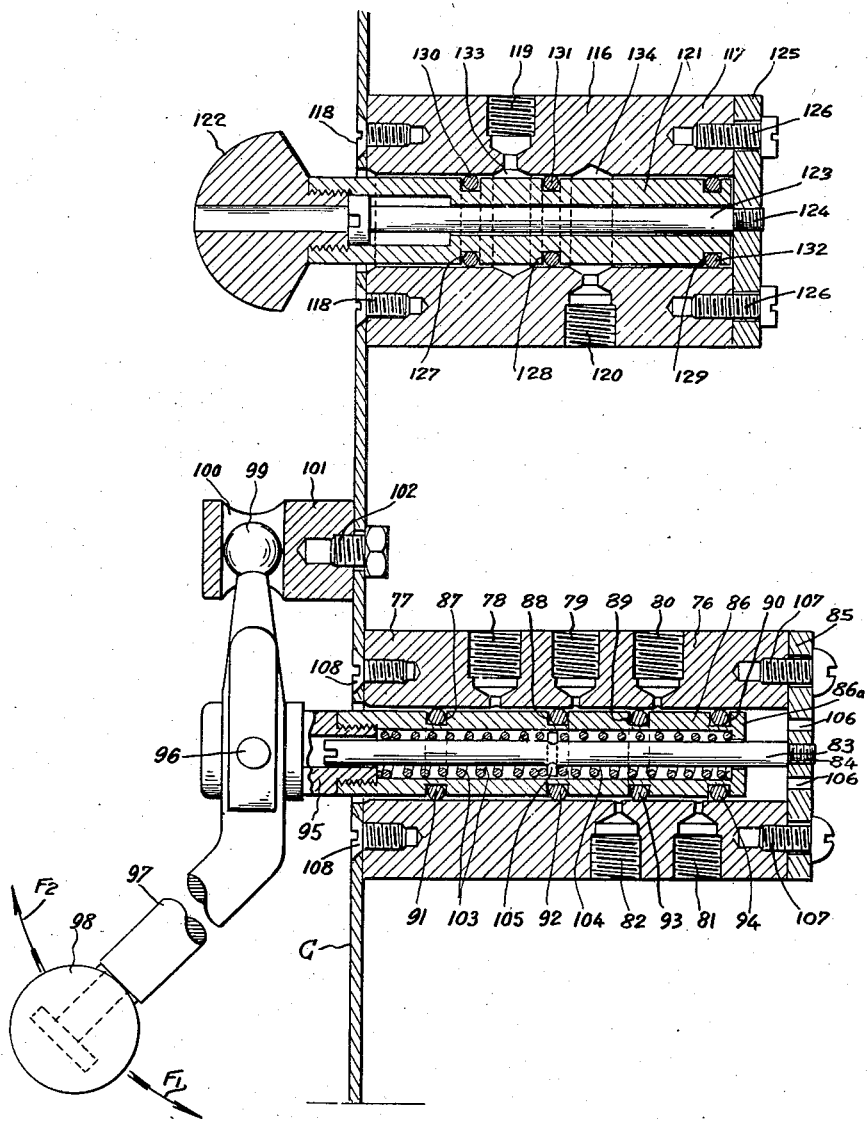
INVENTOR
MAURICE RENÉ VENY
ATTORNEY

2,837,129

AIR DISTRIBUTOR FOR INFLATING AND BALANCING PNEUMATIC TIRES FOR VEHICLE WHEELS

Maurice René Veny, Paris, France, assignor to Societe des Etablissements Roger Brillie, Suresnes, France, a French company Application July 13, 1956, Serial No. 597,705

Claims priority, application France July 22, 1955

5 Claims. (Cl. 141—197)

This invention relates to a distributor for inflating and balancing pneumatic tires on vehicle wheels.

According to the invention, the apparatus comprises two manometers connected by flexible piping mounted on the two valves of the tires of the wheels of a vehicle, this flexible piping being controlled by a distributor enabling each tire to be put in its turn into communication with a compressed air source or with the atmosphere.

Various other characteristics of the invention will be revealed in the detailed description which follows.

Forms of embodiment of the invention are shown by way of example in the attached drawings.

Fig. 1 is a front elevation, partly in section, of an inflation distributor and the balancing mechanism.

Fig. 2 is a lateral elevation of Fig. 1.

Fig. 3 is a vertical section of an element of the inflation distributor, this element being shown on a larger scale.

Fig. 4 is a diagram of the operation of the distributor.

Fig. 5 is a section, on a larger scale, taken along the line V—V of Fig. 2.

Fig. 6 is a diagram of the operation of the inflation distributor.

Fig. 7 is an elevation section, on a larger scale, of two members of the inflation distributor.

Figure 9:
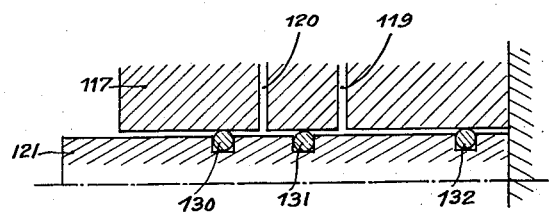
Figs. 8 to 12 are diagrams showing the position of two of the inflating members while the distributor is in operation.

In Fig. 1, the distributor includes a base 1, resting on the ground. A casing 2, with a polygonal-shaped section is on the base 1 and is closed at its upper part by a cover 3.

The front and rear faces of the casing 2 are provided with windows 4, across which are sheets of glass or window-panes 5. A container 6, buried in the ground, underneath the base 1, contains two receptacles 7, 8 which are isolated from the container 6 by a filling 9. The receptacles 7 and 8 contain the bottom part of vertical tubes 10, 11, which, at their ends placed in this receptacle, have capillary ducts. The tubes 10, 11 are terminated at their top part 10a, 11a by cups 12, 13. Each of the afore-mentioned cups comprises an enlargement 14 at its top part in which a protecting screen 15 is placed having ducts 16 of small size. 17 designates a cover closing the cups, each cover being provided with a duct 18 above which a sleeve 19 is fixed. A membrane or flexible pouch 20 is connected on each cup. The two tubes 10, 11 are placed in the casing 2 in such a manner that they can be seen through the windows 4. A graduated scale 21 is provided between the two tubes 10, 11, opposite to the two windows 4. A winch 22 operated by a flywheel 23 enables two cables 24, 25 to be wound on pulleys 26, 27 movably mounted on shafts integral with a frame 21a and the scale 21. The cables 24, 25 descend into the vertical tubes 10, 11, each carrying a runner 28 at its free end. Electrodes 29, 30 are placed inside the receptacles 7 and 8 and are connected by conductors 31, 32 to electro-shutters or valves 33, 34 grounded at 35, 36. A current source S is connected by a conductor 37 to the cables 24, 25.

A compressed air souce C is controlled by a cock 38 and whose pressure can be read on a manometer 39, terminates at a distributor 40 comprising four cocks 41, 42, 43, 44. The cock 41 controls the passage of compressed air towards the cocks 42, 43, whereas the cock 44 controls the connection to the atmosphere of the cocks 42, 43. 45 designates the duct connecting the cock 41 to the cock 42, while a duct 46 connects the cock 42 to the cock 43.

A pipe 47 connects the cock 43 to the cock 44 controlling the duct leading to the atmosphere 48. Two ducts 49, 50 are in connection by piping 51, 52 with the electro-shutters or valves 33, 34 which are connected by flexible pipes 55, 56 to the pneumatic tires of the vehicle wheels for inflating or checking. Branch pipes 57, 58 coming from channels 53, 54, enable the latter to be connected up to the receptacles 7 and 8.

59 designates a device enabling the controls 42a, 43a of the cocks 42, 43, to be connected up. Hg designates the mercury placed in the receptacles 7 and 8. Supports 60, 61 enable the flexible pipes 55, 56 to be rolled. An air intake cock separate from the mercury device is designated by 62.

The inflation and balancing distributor for pneumatic tires of vehicle wheels operates in the following manner:

By opening the cock 38 the compressed air reaches the cock 41. The flexible pipes 55, 56 are then connected to the valves of two tires A and B of a set of wheels of a vehicle. The runners 28 are then brought down in the tubes 10, 11 by means of cables 24, 25 by unwinding the winch 22 until the required pressure is seen on the scale 21. As soon as the pipes 55, 56 are connected up to the tires, the pressure prevailing in these tires can be read, as the mercury Hg rises in the tubes 10, 11. Actually, the air compressed in the pneumatic tires travels along the pipes 55, 56, passes through the branch channels 57, 58 and reaches the receptacles 7, 8 in which the mercury is contained. If the tires are not balanced and their pressure is less than that required, the cock 41 is opened, then the cocks 42, 43, up to the moment when the required value is obtained. At that moment, the electric current arriving by the runners 28 passes through the mercury, because the latter is in contact with the runners. The electro-shutters or valves 33, 34 close. The tires are correctly inflated and properly balanced. The operating members of the cocks 41, 42, 43 are released. If the tire pressure exceeds that required, the runners 28 are raised, then the cocks 42, 43, 44 opened. The tires are then connected to the atmosphere. The cock 44 is closed at the required moment.

The distributor thus enables the inflation and balancing of the pneumatic tires of a vehicle to be effected vary quickly, without the possibility of a mistake. A cock 62 enables compressed air to be taken outside the controlling and balancing circuit.

In certain cases, the tubes 55 and 56 can be paired or concentric, for example, the centre one replacing the tube 55 and the external one replacing the tube 56, each of these tubes separating at each end, the internal tube is then connected to the cock 43 and the tire A and the external tube to the cock 42 and the tire B. The inflation distributor can be placed alone on a service station, or on the other hand, incorporated between two petrol pumps.

The distributor of Fig. 6 is made up of a base resting on the ground which supports a casing having a polygon-shaped section and which is formed, at its top, by a cover. The front and rear faces of the casing are closed by window-panes protecting the two vertical tubes 70, 71 enclosing the mercury colums. These two tubes 70, 71 rest, at their lower part, in receptacles 72, 73 placed in the base of the inflation distributor. These receptacles, which are intended to contain mercury, are connected by channels 74, 75 to a cock 76 (Fig. 7) formed by a cylindrical body 77 drilled with tapped holes 78, 79, 80, 81, 82.

The interior of the cylindrical body 77 is occupied, in its middle by a rod 83 which screws into a tapped hole 84 drilled in the check 85 closing the body 77.

A cylindrical slide-valve 86, hollowed out in the middle, comprises four grooves 87, 88, 89, 90 on its periphery.

Toric washers 91, 92, 93, 94 are placed in the grooves 87 to 90. A head 95 is screwed in the cylindrical slide-valve 86 and carries a spindle 96 on which a lever 97 is articulated provided with a handle 98. 99 designates the terminal knuckle of the lever 97, this terminal knuckle being placed in a duct 100 drilled in a part 101 fixed by a screw 102 to the casing C of the inflation distributor. Two springs 103, 104 are interposed, one between the head 95 and a pin 105 integral with the rod 83 and the other between the same pin and the bottom 86a of the cylindrical slide-valve 86.

Holes 106 are drilled in the terminal check 85, which is held on the body 77 by screws 107.

108 designates the screws holding the body 77 on the casing C of the inflation distributor.

The tapped hole 82 is connected up to the column 70 by the piping 74, while the hole 80 is connected up by the piping 75 to the column 71.

The hole 78 is connected by a pipe 109 to a source of compressed air while the hole 79 is connected by a pipe 110 to the left-hand tire 111 of the vehicle and the hole 81 by a pipe 112 with the right-hand tire belonging to the set of wheels in question.

The pipes 110 and 112 are connected by pipes 114 and 115 between which a cock 116 (Fig. 7) is interposed, which is formed by a sleeve 117 fixed by screws 118 on to the casing C of the inflation distributor. The pipes 114 and 115 respectively terminate at the tapped holes 119 and 120. A slide-valve 121 that can be operated by a button 133 is guided by a rod 123 screwed at 124 into a terminal check 125 held on to the body by screws 126.

Grooves 127, 128 and 129 are cut in the slide-valve 121 and are normally occupied by toric washers 130, 131, 132. Circular clearances 133, 134 are hollowed out in the body 117 facing the terminal part of the holes 119 and 120.

Figure 8:
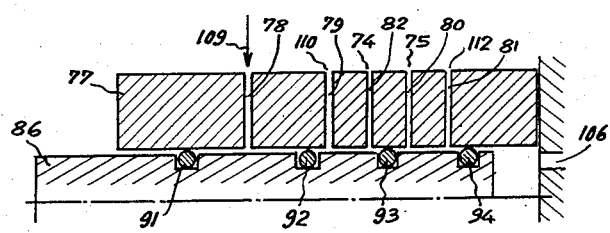

When it is desired to check and inflate the pneumatic tires of a set of wheels, the procedure is as follows:

After having connected up the piping 110 and 112 to the tires 111, 113 of the set of wheels in question, the cock 76 is left in the position shown in Figs. 6, 7 and 8, as well as the cock 116. The air under pressure leaving the tire 113 and passing through the piping 112, the hole 81, the distance separating the body 77 from the slide-valve 86, the hole 80 and the piping 75, reaches the column 71 for that tire, whereas for the other tire 111, the air passes through the piping 110, the hole 79, the space comprised between the body 77 and the slide-valve 86, then through the hole 82, the piping 74, and reaches the column 70.

Figure 10:
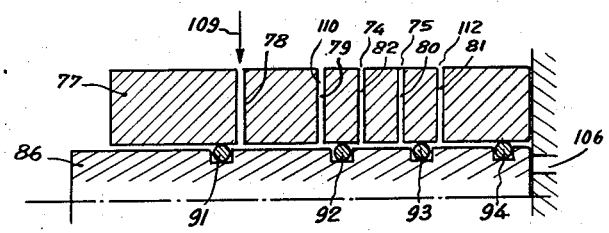

If the pressure is not equal in both tires, the button 122 of the slide-valve 121 of the cock 116 is pulled, so as to put the cavities 133, 134 into communication, by placing the toric washers 131 and 132 on either side of these cavities, so as to ensure air-tightness in front of and behind planes delimited by the holes 119, 120. Thus, by admitting that the pressure prevailing in the tire 113 is greater than that prevailing in the tire 111, air escapes from the tire 113 through the piping 112 and 113, the hole 119, the hole 120, the piping 114, 110 as far as the tire 111. A perfect balance is thus obtained between the two tires, according to the principle of communicating vesels. If it is wished to increase the pressure prevailing in the tires 111 and 113, the lever 97 is pushed in the direction of the arrow $F_1$ (Fig. 7) so as to put the hole 78 into communication with the hole 79 (Fig. 10), the former being connected to the source of compressed air and the latter by the piping 110 with the tire 111 and by the piping 114, the cock 116 and the piping 115, 112 with the tire 113.

Figure 12:
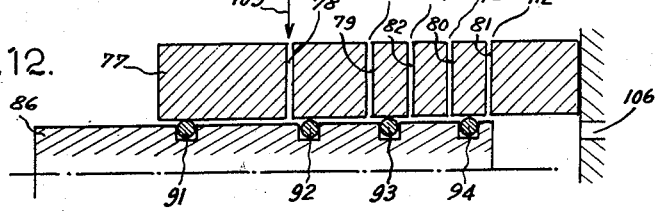

If, on the other hand, it is desired to deflate the tires 111, 113, the lever 97 is pulled in the direction of the arrow $F_2$ (Fig. 7) to put the hole 81 into communication with the atmosphere through the intermediary of the holes 106 (Fig. 12). Air escapes from the tire 113 through the piping 112 and the hole 81 towards the atmosphere, whereas the air of the tire 11 escapes through the piping 114, the cock 116, the piping 112 and the hole 81.

Figure 11:
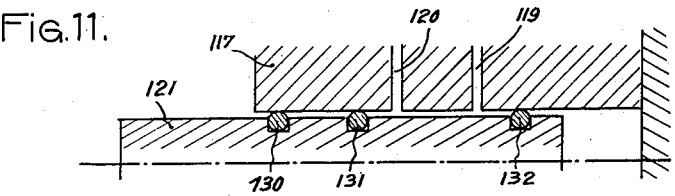

If it is required to check the pressure prevailing in two tires on which the ends of the piping 110, 112 are fixed, the lever 97 is returned to the neutral position (Figs. 6, 7 and 11), then the cock 116 is placed in the position shown in Figs. 1, 2, and 4. The inflation distributor may be placed alone on a service station, or, on the other hand, incorporated between two petrol pumps.

Luminous devices suitably placed enable the pressure prevailing in tires to be read, even at night.

It should be noted that during the inflation operation, the lever 97 being pivoted in the direction of the arrow $F_1$, the mercury manometers 70, 71, are isolated from the compressed air source, just as during the deflation operation the manometers are isolated from the atmosphere. The stability of the mercury and rapid reading are thus assured.

Various modifications may moreover be applied to the form of embodiment given, by way of example, without going outside the scope of the invention.

I claim:

1. An inflation and balancing apparatus for pneumatic tires of vehicles comprising two mercury manometers connected to flexible piping mounted on the two valves of the tires of the respective wheels of a vehicle; and a distributor connected to the flexible piping to put each tire, by means of the flexible piping, in communication with the manometers, then the two tires in communication with each other for balancing the tires, and finally the two tires in communication with a compressed-air source and with the atmosphere.

2. An inflation pump according to claim 1, each of said manometers including a vertical tube immersed in mercury.

3. A pump according to claim 2, in combination with a cable in each of said vertical tubes, a runner in each of said vertical tubes on a respective cable, and electrically operable valves between the distributor and the tires to stop the flow of compressed air when the required air pressure is reached in the tires, said runners being electrically connected by said cables to a source of electric current, and said electrically operable valves being connected to the mercury of said manometers, whereby said valves are actuated when said runners contact said mercury.

4. A pump according to claim 3, wherein said electrically operable valves are grounded.

5. An inflation and balancing apparatus for pneumatic tires of vehicles comprising two mercury manometers connected to flexible piping mounted on the two valves of the tires of the respective wheels of a vehicle; a distributor connected to the flexible piping to put each tire, by means of the flexible piping, successively in communication with the manometers, then the two tires in communication with each other for balancing, and finally the two tires in communication with a compressed-air source or with the atmosphere; and electrically operable valves interposed in fluid communication between the distributor and the tires and electrically connected to said manometers for actuation thereby to stop the flow of compressed air when the required air pressure is reached in the tires.

References Cited in the file of this patent
UNITED STATES PATENTS

| | | |
|---|---|---|
| 1,134,701 | Seeberger | Apr. 6, 1915 |
| 1,866,653 | Jauch | July 12, 1932 |